UNITED STATES PATENT OFFICE.

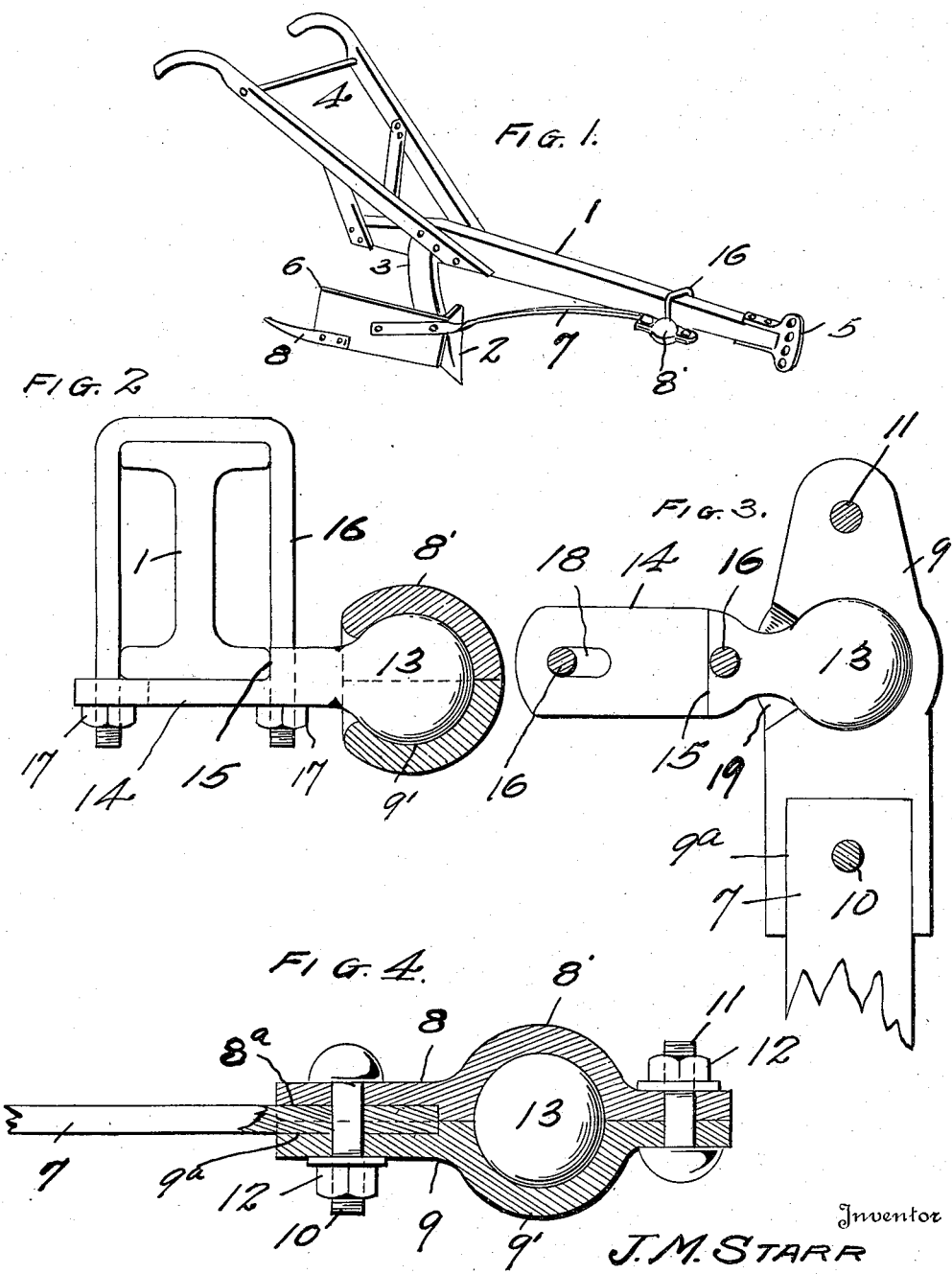

JACOB M. STARR, OF NEWNAN, GEORGIA.

PLOW-FENDER.

1,157,129.

Specification of Letters Patent.   Patented Oct. 19, 1915.

Application filed June 26, 1915.   Serial No. 36,440.

*To all whom it may concern:*

Be it known that I, JACOB M. STARR, a citizen of the United States of America, residing at Newnan, in the county of Coweta and State of Georgia, have invented certain new and useful Improvements in Plow-Fenders, of which the following is a specification.

The present invention relates to improvements in plow fenders, to be used as an attachment for plows of usual type and construction.

The primary object of the invention is the provision of means for attaching the fender to the plow beam in such manner that the fender may be adjusted with relation to the plow, to accomplish certain different objects with facility and efficiency, and to this end the invention consists essentially in attaching the fender to the plow beam by means of a ball and socket joint, or a universal joint, and further in certain novel combinations and arrangements of parts as will be hereinafter pointed out.

In the accompanying drawings I have illustrated one complete example of the physical embodiment of my invention constructed according to the best mode I have so far devised for the practical application of the principles of my invention.

Figure 1 is a perspective view of a standard type of plow with my fender attached thereto according to my invention. Fig. 2 is a sectional view at the universal joint. Fig. 3 is a view showing the top plate of the attachment removed with the bolts in section. Fig. 4 is a longitudinal sectional view of the plates forming the joint.

In my drawings I have illustrated the preferred embodiment of my invention in connection with a standard plow having the usual beam as 1 shown in Fig. 1 as of wood, while in Fig. 2 it is indicated as a typical I-beam.

The plow point 2 is of usual construction and is supported from the beam by the shank 3, and the implement is of course provided with the handles 4 and clevis 5, and other devices to complete the implement.

I have illustrated the blade of the fender 6 as a rectangular figure having attached thereto the resilient stem 7 preferably a twisted metallic bar, and at the rear of the blade a rearwardly extended horn or piece 8 is attached to draw or turn the soil over into the furrow as the plowing proceeds.

The blade 6 of the fender is held in adjusted position with relation to the plow by means of the attaching device which holds the stem or shank 7 in connection with the beam 1. This attaching device comprises the two metallic plates 8 and 9 formed with the respective hemispherical cupped portions 8' and 9', and also fashioned with under cut faces 8$^a$ and 9$^a$ complementary to each other and designed to form a pocket for the end of the shank 7 as shown in Fig. 4. The pocket is rectangular in shape to receive and embrace the rectangular end of the shank 7 and by this construction the shank is held rigidly against lateral or vertical motion. The two plates 8 and 9 are clamped together and retained in this position by means of a pair of bolts 10 and 11, passed through perforations in the plates and retained by nuts 12. In addition to clamping the plates together, the bolt 10 also fixes the end of the shank 7 in its pocket and prevents withdrawal of the shank from the pocket.

The hemispherical portions of the two plates form the socket for the ball member 13 which is formed integrally with the flat bar 14 arranged at right angles to the general direction of the socket plates and formed with a shoulder 15 to bear against the bottom edge of the plow beam. The bar 14, as clearly seen in Fig. 2, extends across under the plow beam, and is attached thereto by means of the inverted U-shape bolt 16 which is provided with threaded prongs passed through perforations in the bar and secured by means of the nuts 17. One of the perforations may be elongated, as 18, to adjust the bar for use in connection with beams that are narrower than that shown in Fig. 2, and of course in case the beam is narrower, a narrower bolt 16 will be used.

The two socket plates 8 and 9 are each provided with a flaring cut away portion as 19 to form a throat or opening by means of which the socket plates may be turned and adjusted on the ball 13, and by this arrangement the plowman is enabled to adjust the fender vertically and laterally, within limits, and to even set the fender in a perpendicular position, or to adjust it at an angle of as much as 60 degrees. This adjustment, and capability of adjustment are very important, as for instance when the fender is turned with its bottom edge next to the plants, the soil is caught at the upper edge and dropped into the furrow made by the plow 2, leaving the ground and plants in best possible condition for cultivation. When the plants have grown somewhat, the oblique adjustment may be changed slightly so that the fender may be raised above the ground, but with the bottom edge toward the furrow, and the fine soil then passes under the fender to the plants and the balance of the soil falls back into the furrow.

Other adjustments may be accomplished by means of this novel form of attachment and adjustment of the fender, and the different positions may be reached and the device fixed in the desired position with facility and despatch. It will be understood of course that all the adjustments are made by loosening the bolts 10 and 11, adjusting the parts, and then tightening the nuts 12. Or it may be found unnecessary to loosen the bolt 10, for it is evident that the bolt 11 will be sufficient to clamp the forward end of the socket plates together on the ball 13.

What I claim is—

The combination with a transverse bar formed with a shoulder bearing adapted to receive a plow beam which is bolted thereto, and a ball at the free end of the bar, of a pair of clamp plates formed with a socket to receive a fender shank, said clamp plates each having a semispherical socket portion embracing the ball, and clamp bolts and nuts for securing said plates together.

In testimony whereof I affix my signature in presence of two witnesses.

JACOB M. STARR.

Witnesses:
R. W. JACKSON,
L. TURNER.

Copies of this patent may be obtained for five cents each, by addressing the "Commissioner of Patents, Washington, D. C."